(12) United States Patent
Tsatsanis (10) Patent No.: US 7,274,734 B2
(45) Date of Patent: Sep. 25, 2007

(54) ITERATIVE WATERFILING WITH EXPLICIT BANDWIDTH CONSTRAINTS

(75) Inventor: Michail Tsatsanis, Irvine, CA (US)

(73) Assignee: Aktino, Inc., Irvine, CA (US)

( * ) Notice: Subject to any disclaimer, the term of this patent is extended or adjusted under 35 U.S.C. 154(b) by 714 days.

(21) Appl. No.: 10/813,881

(22) Filed: Mar. 30, 2004

(65) Prior Publication Data

US 2005/0220179 A1  Oct. 6, 2005

Related U.S. Application Data

(60) Provisional application No. 60/546,616, filed on Feb. 20, 2004.

(51) Int. Cl.
*H04B 1/38* (2006.01)
(52) U.S. Cl. .................................. 375/222
(58) Field of Classification Search ............... 375/222, 375/224, 346; 370/431, 464
See application file for complete search history.

(56) References Cited

U.S. PATENT DOCUMENTS

| 6,741,604 B1* | 5/2004 | Rippin et al. ............... 370/431 |
| 7,158,563 B2* | 1/2007 | Ginis et al. ................. 375/224 |
| 2003/0086514 A1 | 5/2003 | Ginis et al. |
| 2005/0152442 A1* | 7/2005 | Duvaut et al. .............. 375/222 |

* cited by examiner

*Primary Examiner*—Khai Tran
(74) *Attorney, Agent, or Firm*—Perkins Coie LLP (57) ABSTRACT

The present invention provides an iterative method of allocating bandwidth in a twisted pair modem communication network in order to maximize communications speed while reducing NEXT interference. The method determines frequency bandwidths that cause NEXT interference and eliminates these harmful frequencies. In further embodiments, the invention adjusts other parameters of transmission such as decreasing bitloading rates and power within problematic frequency bandwidths, while increasing power and bitloading in the remaining frequencies. The methods provide an iterative process that ensures an appropriate signal to noise ratio and maximum data transfer.

27 Claims, 6 Drawing Sheets

ITERATIVE WATERFILING WITH EXPLICIT BANDWIDTH CONSTRAINTS

CROSS REFERENCE TO RELATED APPLICATIONS

This application claims the benefit of Michail Tsatsanis's U.S. Provisional Patent Application No. 60/546,616, entitled "ITERATIVE WATERFILING WITH EXPLICIT BANDWIDTH CONSTRAINTS", and filed on Feb. 20, 2004, and which is hereby incorporated by reference in its entirety.

BACKGROUND OF THE INVENTION

1. Field of the Invention

The present invention is concerned with the allocation of spectral bands to the upstream and downstream directions in twisted pair modem communications. Specifically, the invention aims at a spectral management scheme that minimizes interference among transmissions in different pairs and can accommodate mixtures of symmetric and asymmetric services in the same binder group of twisted pairs. The invention further relates to a dynamic and distributed spectral management paradigm that can be implemented through a set of simple rules.

2. Prior Art

Communication systems that interconnect users over twisted pair wireline connections are being developed to support broadband data communication. Recent developments in broadband communication protocols allow broadband data to be overlaid on these existing twisted pair connections that also carry narrowband voice or integrated service digital network (ISDN) traffic. Specifically, the interconnection of modems allows broadband data to be communicated on unused frequency channels of the existing twisted pair lines. These unused or spare frequency channels are isolated from the conventionally encoded voice signals by a suitable filter.

Depending upon the complexity of the coding scheme, overlaid broadband systems can support data rates in excess of two Megabits per second (Mbps), although this rate is dependent upon the physical parameters of the connection, e.g. the overall length of the twisted pair and its composition and configuration. Asymmetric Digital Subscriber Line (ADSL) and High-speed Digital Subscriber Line (HDSL) protocols, for example, can support data rates of 2 Mbps over distances of approximately three kilometers, while more complex schemes (such as VDSL) can support data rates of 8 Mbps and above over distances of, typically, less than two kilometers.

Some xDSL systems employ a time division duplex transmission scheme in which a communication resource (such as a dedicated channel within frequency limits) has a time-split use for up-link and down-link transmissions between line termination equipment and the customer equipment. More specifically, the up-link and down-links may have different traffic capacities. For example, in an Internet-type environment, it is usually beneficial to have a higher down-link capacity since information download is the dominant data flow, whereas general business traffic generally requires equal traffic capabilities in both directions.

In relation to bundles of twisted pair wireline communication resources, it is also important to consider the potentially undesirable effects associated with cross-talk interference. Specifically, with bi-directional communication, the relative location of the lines, for example, between twisted copper-pair causes cross-talk interference to be induced into proximately located wireline communication resources (principally by the mechanisms of capacitive and inductive coupling and by radiation arising from the imperfect nature and performance of the cabling). Moreover, where symmetrical and asymmetrical services are simultaneously required on pairs in the same bundle, cross-talk becomes a significant problem.

One type of interference in these types of systems is referred to as near-end cross-talk or NEXT. NEXT occurs when electromagnetic interference is induced into a twisted pair wireline resource that is communicating information in an opposing direction, e.g. downlink (or downstream) information appears as noise in an uplink (or upstream) path. NEXT is undesirable because near-end generated interference is at a level that can potentially swamp data signals received from a remote terminal, which data signals have previously been subjected to attenuation through the transmission path. NEXT is generally produced by local end amplifiers. Furthermore, NEXT increases significantly at the higher frequency components and so is even more undesirable in high frequency data-over-voice wireline systems, such as VDSL. To avoid the harmful effects of NEXT in a TDD system, an ensemble of collated communication resources must have synchronized and aligned transmissions. However, in a mixed symmetrical-asymmetrical system, NEXT often occurs where the two opposing schemes have either different frequency allocations (in frequency division duplex, FDD) or different time slot allocations (in TDD).

Another kind of interference in these types of communications systems is referred to as Far End Cross-Talk (FEXT). This form of cross-talk affects non-addressed ports of a remote terminal. In other words, FEXT occurs when electromagnetic interference (i.e. noise) is induced into a wireline resource that is communicating information in a similar direction, e.g. upstream (or up-link) information appears as noise in another upstream wireline resource to an extent that performance on a given pair is limited. The effects of FEXT are correspondingly reduced by the attenuation path of the wireline resource. However, when multiple separate modem links exist, crosstalk between the numerous signals at an exchange point generates noise that limits the data-rate performance of both a given pair and the entire wireline system, in general.

Figure 1:
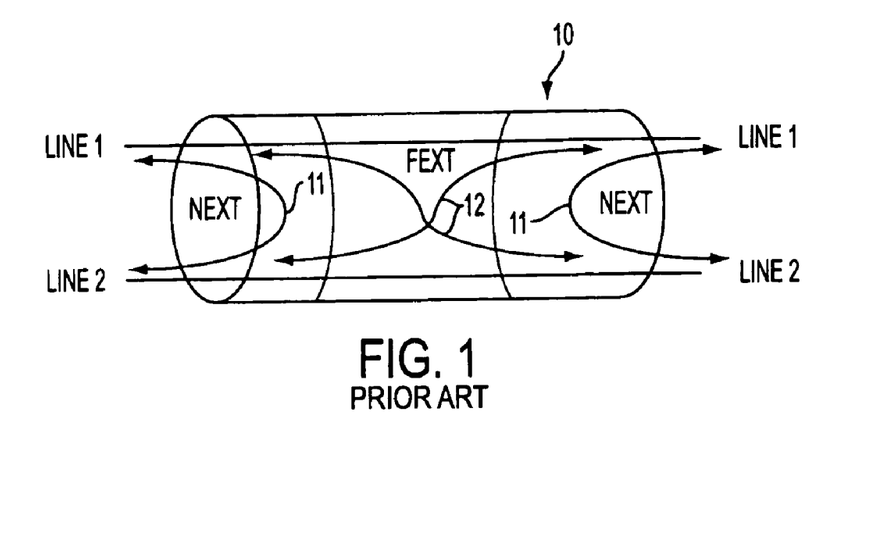
FIG. 1 shows a prior art cable and associated types of interferences.

FIG. 1 shows the interference issues that arise in prior art cables when multiple twisted copper pairs are bundled together in binder groups. The cable 10 contains line 1 and line 2 that are transmitting data as described above. In this example only interference between two pairs is depicted. Near end crosstalk II (NEXT) is induced on both ends of the cable 10, while far end crosstalk 12 (FEXT) resulting from the far end transmitters, also couples into both lines 1 and 2, and is in both directions of transmission. In many cases NEXT is more detrimental than FEXT especially in medium and long length loops. Spectral management techniques are frequently evoked to mitigate the NEXT interference problem.

Figure 2:
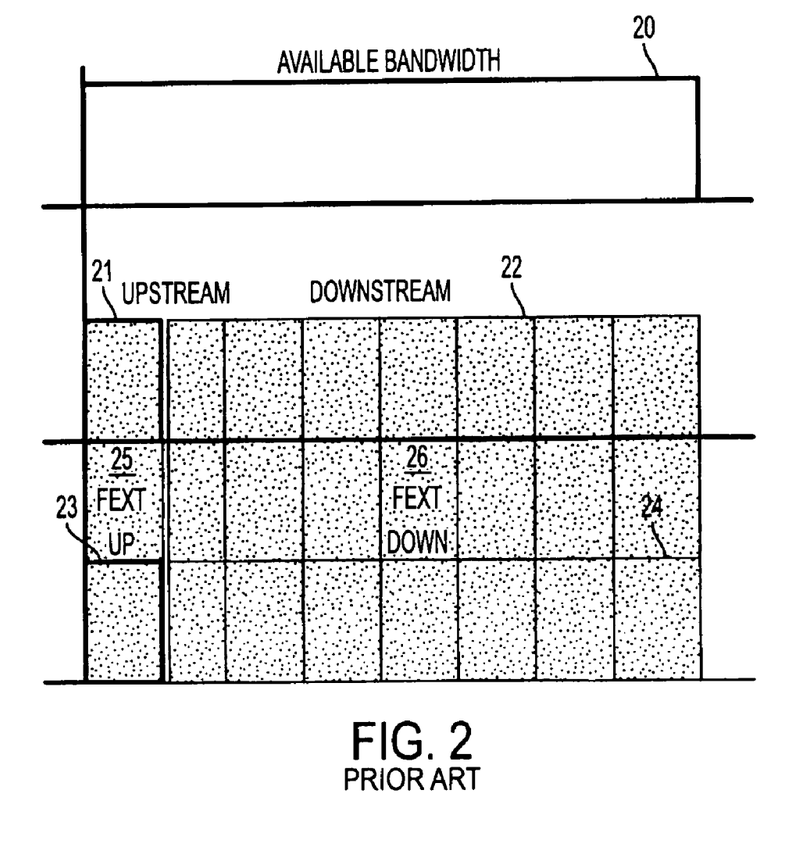
FIG. 2 shows a diagram of prior art bandwidth communications.

FIG. 2 demonstrates a prior art frequency division multiplexing approach (FDM), where the available bandwidth 20 on each line is divided for upstream transmission 21 and 23, and downstream transmission 22 and 24. In this scheme the upstream and downstream transmission bands are separated in frequency. In this type of FDM the induced NEXT is out of band in each direction and hence is of little or no concern. FEXT is still present in both directions and is shown by the shaded areas 25 and 26. This scheme works well if all the pairs in the binder deliver the same service and hence have the same FDM band plan. For example, this spectral band plan and this separation works well when all pairs in the binder deliver ADSL service to residences.

Figure 3:
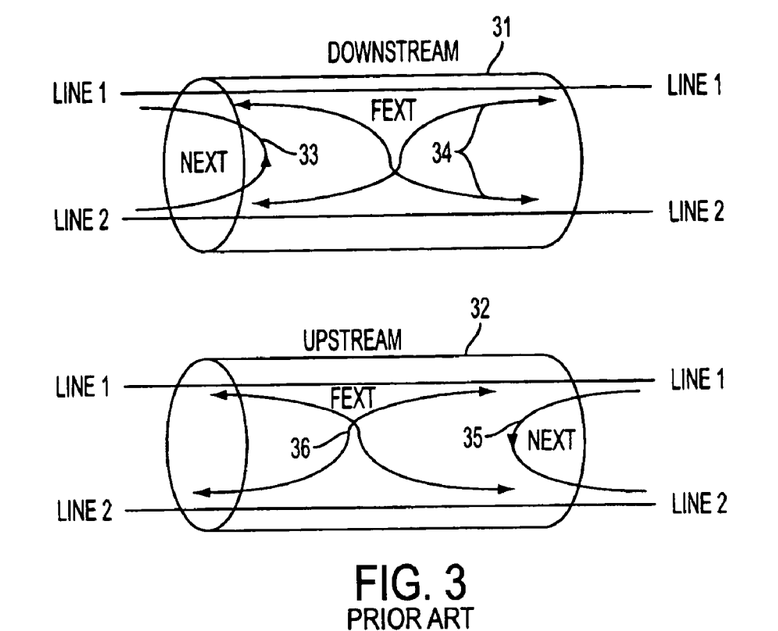
FIG. 3 shows a prior art cable and associated types of interferences.

Unfortunately, in many instances there is a need for mixing asymmetric and symmetric services in the same binder (e.g., residential and business services in the same neighborhood). FIG. 3 shows cables 31 and 32 that transmit symmetrically along line 1 and asymmetrically on line 2. The NEXT interference is depicted by arrows 33 and 35. The FEXT interference is indicated by arrows 34 and 36. In the downstream direction in 31 the asymmetric service transmitter uses more bandwidth and induces NEXT into the symmetric service receiver. Conversely, on the customer side the symmetric service transmitter uses more bandwidth upstream and induces NEXT into the asymmetric receiver.

Figure 4:
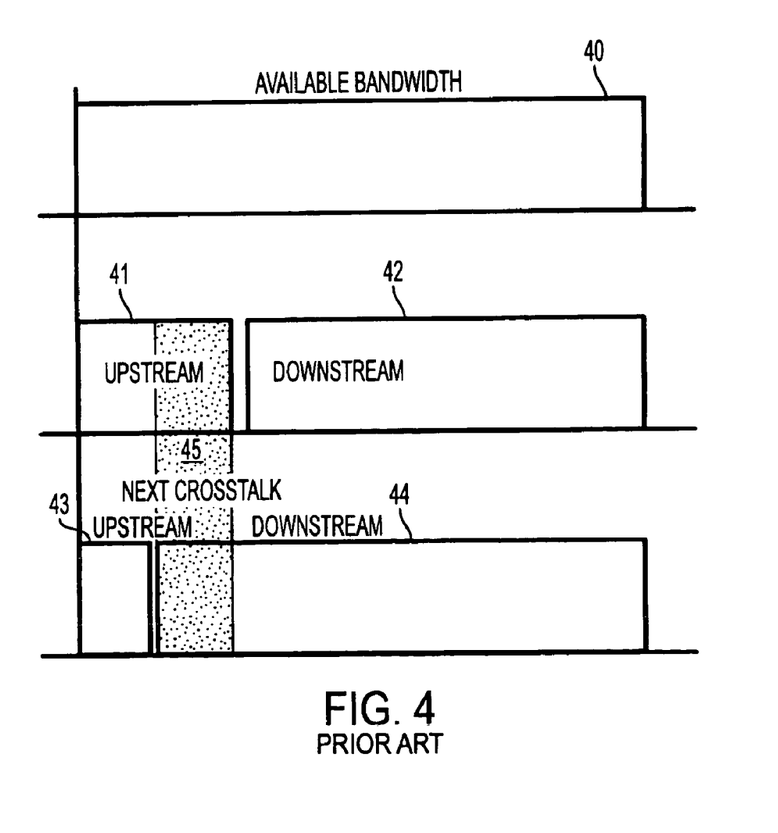
FIG. 4 shows a diagram of prior art bandwidth communications.

FIG. 4 shows the resulting interference problems in the prior art when two pairs use different symmetry ratios and hence band plans that are not perfectly aligned. The available bandwidth used for transmission is shown in 40. Line 1 has upstream bandwidth 41 and downstream bandwidth 42. Line 2 has upstream bandwidth 43 and downstream bandwidth 44. As shown by shading 45, there now exists overlap between the upstream 41 and downstream 44 bands of the different pairs and NEXT interference 45 is not completely out of band.

These problems are accentuated when the different interacting pairs have different loop lengths. More intelligent spectral management techniques are needed so that modems minimize their spectral pollution whenever possible. The most straightforward way to contain the interference problem is to define static spectral management rules and fixed spectral masks that every modem should follow. The ANS1 T1.417 Spectral Management Standard, Issue 2, 2003, is one example of this approach. While the problem is not eliminated, some safeguards are put in place so that interference does not get out of hand.

More advanced approaches are based on the modems dynamically adjusting their spectra based on noise and interference conditions. These dynamic spectral management schemes (DSM) impose rules that instruct the modems to not transmit excessive amounts of energy when not necessary as detailed in "Dynamic Spectral Management (DSM) Technical Report, Committee T1E1.4, 2003". The simplest form of DSM requires the modems to voluntarily back off their transmit signal power when operating with excess SNR (also called excess SNR margin). This "good citizen" behavior results in less spectral pollution overall and benefits everybody.

Recently, a more involved DSM approach has been proposed called "iterative waterfilling". It is also based on the idea of each modem voluntarily performing power back-off when possible but each time this happens, the modem re-distributes its available power across the frequency band using the well known communications theory principle of waterfilling as in U.S. Patent Application 20030086514, May 8, 2003. In simple words, this process puts more energy where the SNR is higher and less energy where the SNR is lower. This method holds some promise for improved crosstalk protection. It was recently shown however in Jan Verlindens paper "Target PSD Obtained With Iterative Waterfiling is Almost Flat", T1E1.4/2003 contribution no. 295, that given the way iterative waterfilling is implemented in DSL modems (with DMT modulation) the results are very similar to those of a simple power back-off.

All these DSM methods are well suited to situations that are FEXT dominated (e.g., VDSL systems on short loops). For systems on longer loops however, FEXT is only a secondary concern, compared to the effects of NEXT. Power back-off methods do not specifically address or correct the NEXT interference issues as shown in FIG. 4.

SUMMARY

The present invention provides an iterative method of allocating bandwidths in a twisted pair modem communication network in order to maximize communications speed while reducing NEXT interference. The method includes the steps of beginning with an initial power spectral density mask (PSD), measuring the signal to noise ratio using the selected mask, bitloading the channel for a target rate of data transmission and a target signal to noise ratio (SNR) and again measuring the SNR, and then increasing or decreasing the allocated bandwidth of the initial PSD based on the measured signal to noise ratio.

In another preferred embodiment, the steps of adjusting the bandwidth further comprise adjusting the power levels of some frequencies within an adjusted bandwidth. The lowered power levels of these adjusted frequencies enables data to be transmitted in bandwidths that would cause significant interference using prior methods. By measuring the signal to noise ratio the present invention determines which frequency bandwidths allocated in a predetermined power spectral density mask are producing NEXT interference. The parameters of bitloading rates, power, and frequency bandwidth of the power spectral density mask are then accordingly adjusted to minimize NEXT interference and maintain a desired signal to noise ratio.

In order to support the above methods the present invention includes structures such as a system controller that includes a controlling modem, a controlling memory and a controlling processor. These structures operate and enact the present invention to iteratively reduce NEXT interference along each modem communication link.

DETAILED DESCRIPTION

The present invention provides an iterative method of allocating bandwidth in a twisted pair modem communication network in order to maximize communications speed while reducing NEXT interference. The present invention further provides for adjusting the power and bitloading rates of transmitted signals in order to achieve maximum data transfer with an appropriate signal to noise ratio. The description of the embodiments herein is meant to be illustrative only and not limited to the examples given.

Figure 5:
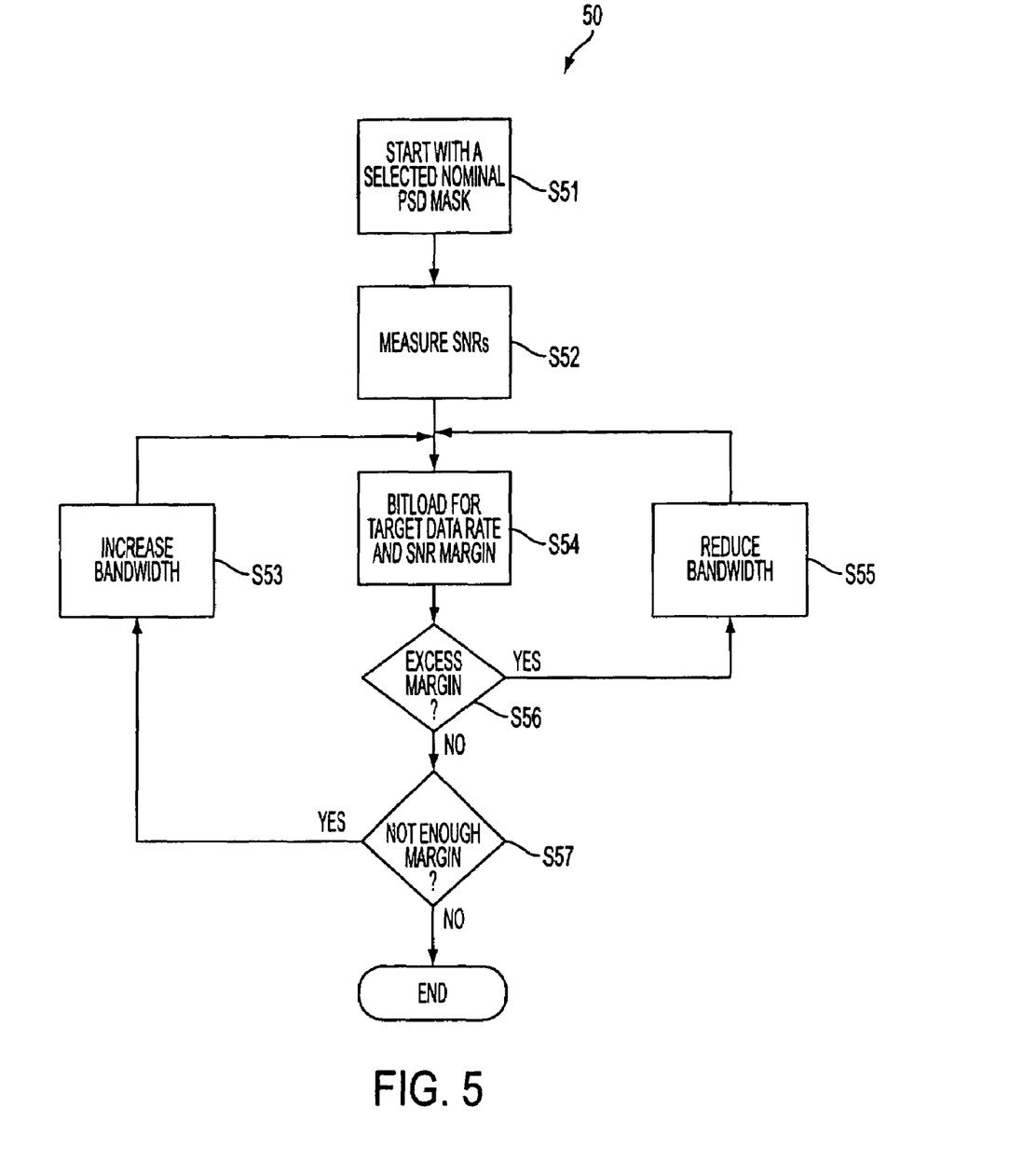
FIG. 5 shows a flowchart of the steps in one embodiment of the present invention.
Figure 8:
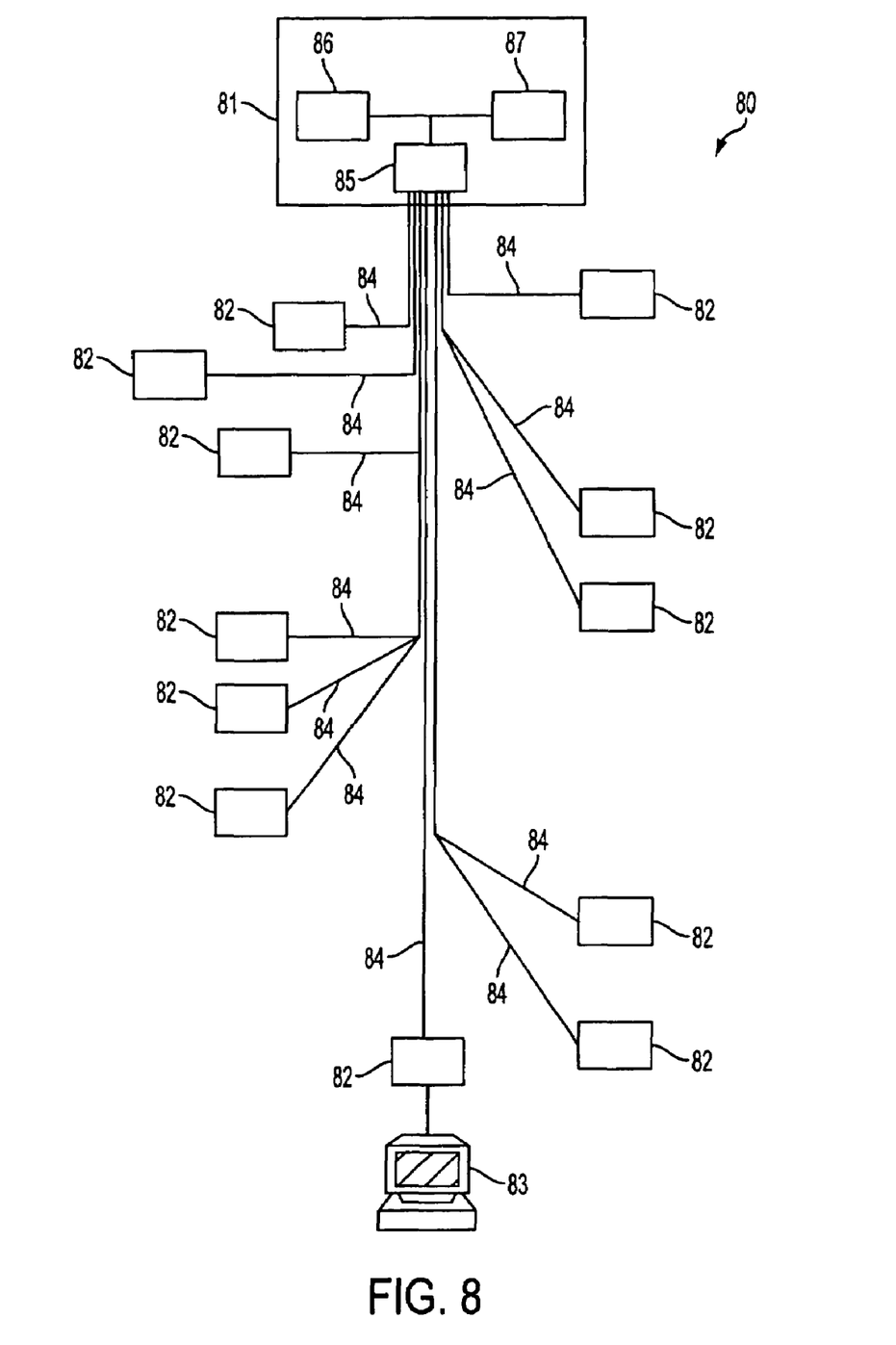
FIG. 8 shows structures in one embodiment of the present invention.

FIG. 5 shows a flowchart of steps 50 that illustrate one embodiment of the present invention. The process of FIG. 5 is repeatedly performed for each communications channel line as is shown in FIG. 8 until an equilibrium point is reached. Once the bandwidth has been accordingly adjusted for a given channel link, the next channel is selected for the process. The process 50 begins in step S51 where communications begin using a nominal predetermined power spectral density (PSD) mask that has been selected for communications. If this particular modem has performed the steps of process 50 in one or more past iterations, then the initial PSD used in step S51 for the current iteration is the PSD that process 50 produced for that particular modem at the end of the last iteration. In step S52 the signal to noise ratio (SNR) is measured. Once the SNR is determined in step S52, it is employed for a loading of bits across the frequencies for a given target data transmission rate and SNR margin as set forth in step S54. In step S56 it is determined if the resulting actual SNR margin is in excess of the target margin beyond an acceptable tolerance.

If the answer is "Yes" in step S56, the signal is strong enough so that the required bandwidth for successful signal transmission may be reduced. The actual reduction of bandwidth is performed in step S55. If the resulting actual SNR margin is not in excess of the target margin as determined in step S56, the process proceeds to step S57. If there is not enough SNR margin in the channel, i.e. the answer in step S57 is "Yes", the signal is weak and more bandwidth is required. The increase of bandwidth is enacted in step S53. The process 50 concludes when the target rate of data transfer and the SNR margin are achieved within an acceptable tolerance. This process therefore adjusts bandwidths and bit rates to minimize the amount of NEXT interference while inherently using the minimum amount of required bandwidth.

Figure 6:
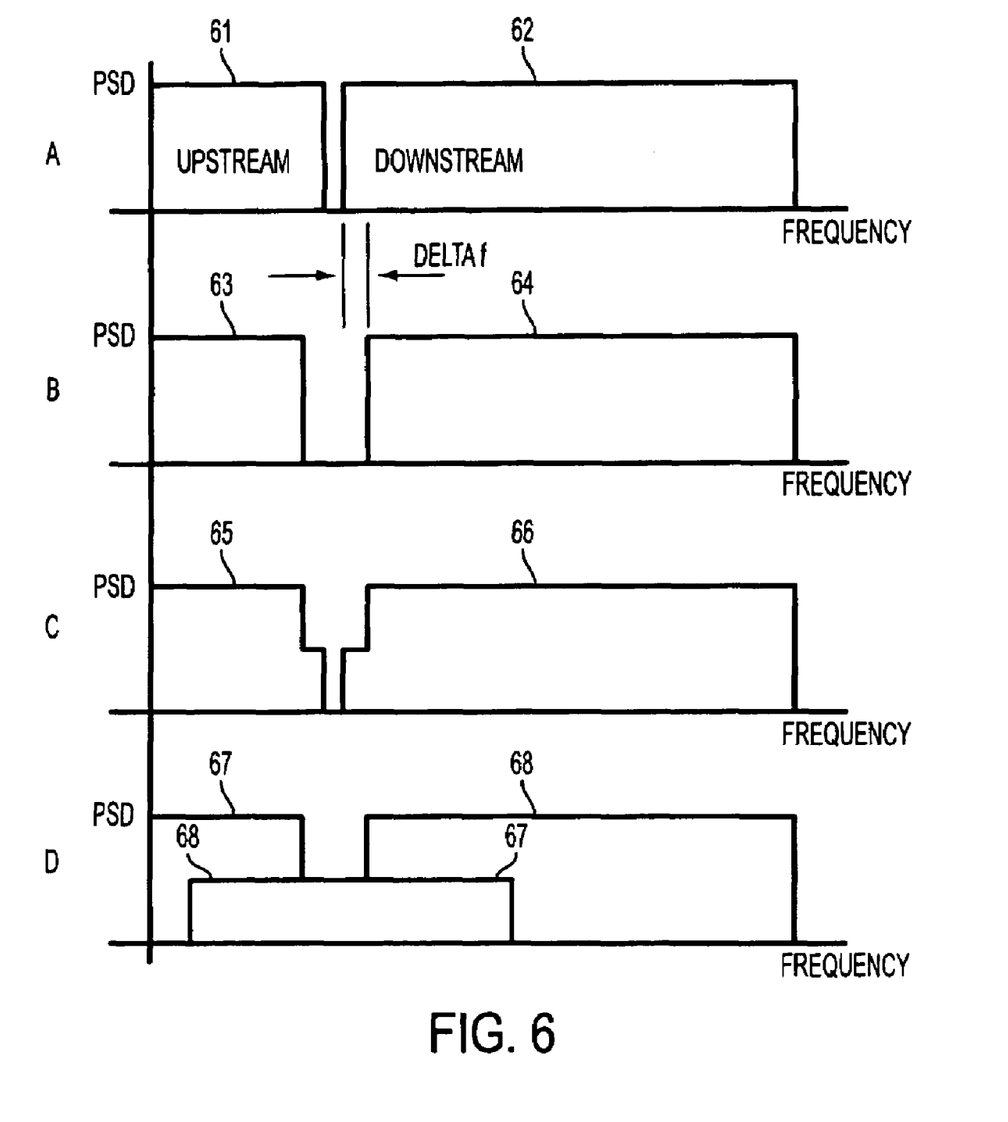
FIGS. 6A-6D show frequency bandwidth diagrams resulting from embodiments of the present invention.

Finally, this process 50 must be repeated separately for the upstream and the downstream directions of communication, and for each communication line in the network. FIG. 6B shows the resulting decrease of the bandwidth as would be enacted by the process steps of FIG. 5. Although FIG. 6B shows a decrease of bandwidth (relative to FIG. 6A), the present invention may also increase bandwidth if the initial PSD mask selected in the process was too conservative. The amount of bandwidth reduction (Delta f) or increase (enacted by steps S53 and S55) would be set to some predetermined value, such as 5%. So if the process 50 is iteratively performed 3 times for one particular communications channel, the bandwidth reduction would be 15%. In a DMT system, this value could be set equal to one or more DMT "tones", or frequency subchannels.

For example, the desired SNR margin may be 6 dB, meaning that after bitloading by the method of FIG. 5, each frequency subchannel should carry a certain number of bits and still possess 6 dB more SNR than the absolutely minimum required to transmit those bits with a predetermined reliability. If the initial PSD mask as shown in FIG. 6A results in a bitloading across the frequency subchannels such that each subchannel carries the appropriate number of bits and still possesses an excess SNR of say 15 dB, the method of FIG. 5 would continue reducing the frequency bandwidths of the upstream and downstream communications (as in step S55) by an amount Delta f, until the resulting excess SNR reaches the desired target SNR margin value of 6 dB (within a predetermined tolerance). If for example a channel is measured to be communicating at an SNR margin of 2 dB, the bandwidth is raised by incremental amounts Delta f (as in step S53) until the SNR margin reaches 6 dB (within a predetermined tolerance).

FIG. 6A shows an example of a nominal PSD with non-overlapping upstream and downstream bandwidths 61 and 62 respectively. FIG. 6B shows the PSD after the step of decreasing the bandwidth by an amount Delta f Both the upstream 63 and the downstream 64 bandwidths have been reduced. Although they do not necessarily have to both decrease at all times. While the upstream band-edge moves to the left, the downstream band-edge moves to the right, in this way the present invention creates a band gap between the two PSDs. This is precisely the desirable effect that minimizes NEXT interference. Therefore once the problematic frequencies have been removed, bitloading is adjusted to provide maximum data transfer rates on the remaining frequencies.

If in a different type of transmitting configuration, the position of the upstream and downstream PSDs where interchanged, the bandedge movements would be interchanged as well to result in the same effect of further band separation. Finally, if in a different configuration there are multiple alternating upstream and downstream masks, there will be more than one band separation points. Then this process can be extended to more than one way. It can be designed to focus on one of the separation points and provide maximum band gap at that point or it can spread the band gap equally to the multiple separation points.

Figure 7:
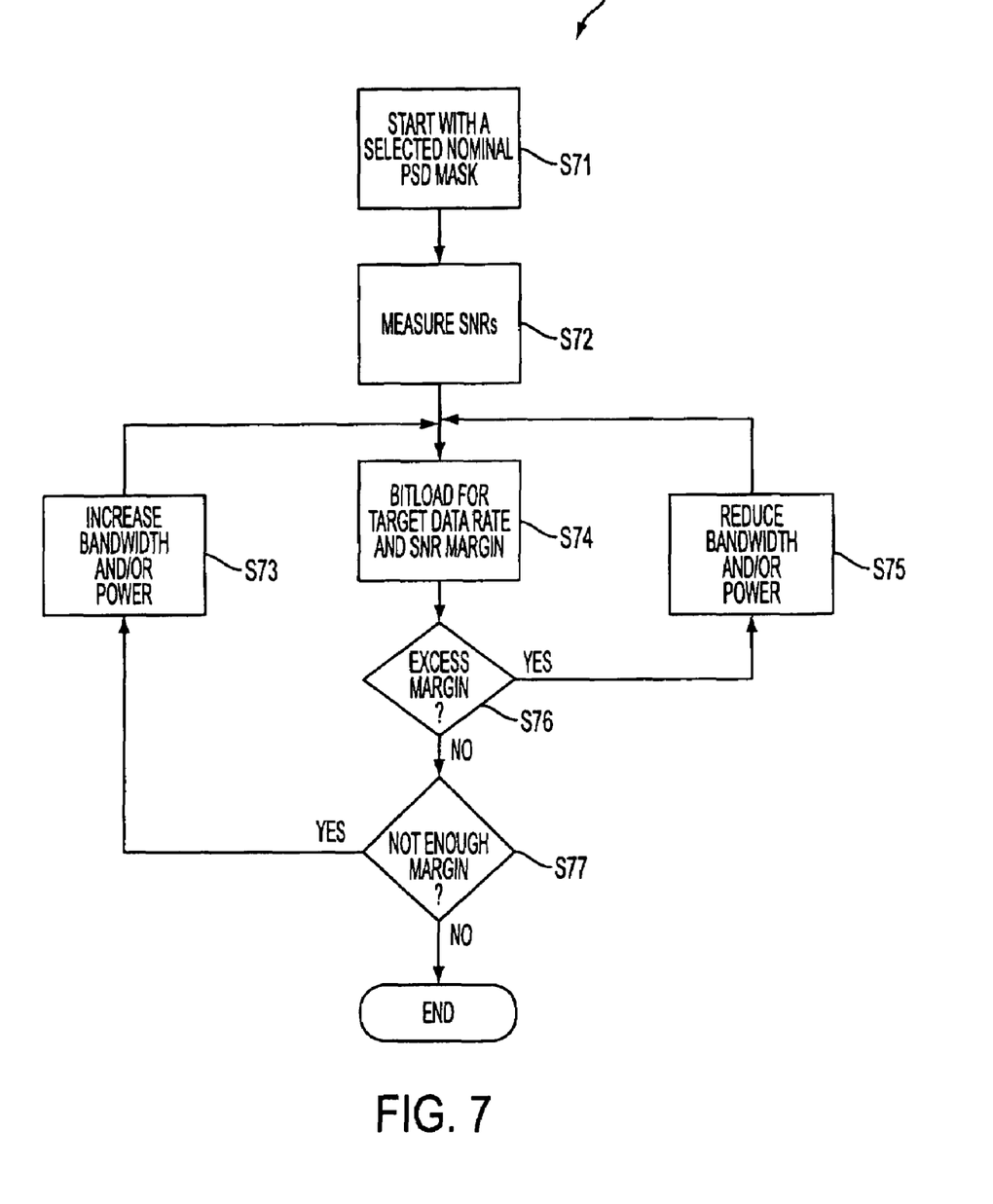
FIG. 7 shows a flowchart of the steps in another embodiment of the present invention.

FIG. 7 shows another method enacted by the present invention. Some resulting signals produced by the method of FIG. 7 are shown in FIGS. 6C and 6D. The process 70 of FIG. 7 is also repeatedly performed for each modem communications channel line. Once the bandwidth has been accordingly adjusted for a given channel link, the next channel is selected for the process. The process 70 begins in step S71 where communications begin using a nominal predetermined power spectral density (PSD) mask that has been selected for communications as shown in FIG. 6A. In step S72 the signal to noise ratio (SNR) is measured. Once the SNR is determined in step S72, the channel is bitloaded across the frequencies for a given target data transmission rate and SNR margin as set forth in step S74. In step S76 it is determined if the resulting actual SNR margin is in excess of the target margin.

If the answer is "Yes" in step S76, the signal is strong enough so that the required bandwidth and/or power for successful signal transmission may be reduced. The actual reduction of bandwidth and power is performed in step S75. The amount of bandwidth reduction may be 5% and the amount of power reduction in the designated frequency range Delta f may be 5 dB. These values of incremental adjustments (to bandwidth and power) are determined by algorithms designed to optimize the SNR's and data rates of transmission, while ensuring minimal adjustments to the initial PSD masks. The bitloading rates are also adjusted to provide maximum data transfer. If the resulting actual SNR margin is not in excess of the target margin as determined in step S76, the process proceeds to step S77. If there is not enough SNR margin in the channel, i.e. the answer in step S77 is "Yes", the signal is weak and more bandwidth and/or power is required. The increase of bandwidth and power is enacted in step S73. The process 70 concludes when the target rate of data transfer and the SNR margin are achieved. This process therefore adjusts signal bandwidth and power to minimize the amount of NEXT interference while inherently using the minimum amount of required bandwidth.

FIG. 6C shows resulting signals 65 and 66 of a PSD produced by the process of FIG. 7. In this case the power in the band Delta f is not completely driven to zero as it would be using the process of FIG. 5. The PSD is reduced by a certain amount, calculated such that the induced NEXT is sufficiently mitigated, yet some data carrying capacity is still available in this Delta f band.

FIG. 6D shows another example of bandwidth allocation using the method of FIG. 7. If the transmitting PSD in certain bands can be sufficiently reduced so as not to introduce harmful NEXT effects, then these low-PSD bands can extend into the band of the opposite direction, assuming that the transceiver has the capability of spectrally overlapped duplexing. The upstream 67 and downstream 68 bands of FIG. 6D can be partially or fully overlapped and can fit into the iterative bitloading framework. Therefore the power reduction and frequency bandwidth allocation method of FIG. 7 may be applied in numerous ways to a variety of existing communications methods.

The process of FIG. 7 therefore adjusts bitloading rates, power and frequency bandwidths by incremental amounts until the communications channel transmits with a SNR margin of for example 6 dB. It will be appreciated by those skilled in the art that different schemes may be employed for the incremental adjustments of power and bandwidth as described above. For example one iteration of the process 70 may reduce bandwidth by 10% and power by 3 dB, whereas another iteration may reduce bandwidth by 5% and power by 6 dB. It is also noted that a given PSD mask may remain unchanged while bitloading is adjusted.

FIG. 8 shows a schematic diagram of a twisted pair modem communication system 80 according to the present invention. The system 80 supports data communications over voice communications in an xDSL-type environment. A controller 81 receives communications from a plurality of modems 82. Each modem 82 transmits signals from some digital data source such as a personal computer 83. The controller 81 is separately coupled to each modem 82 through individual or sometimes shared twisted pairs 84. The twisted pairs 84 are typically made of adjoining lengths of copper, although aluminum sections are sometimes present. The twisted pairs 84 are often unshielded. While each modem 82 is shown as physically separate entity, it will be appreciated that the modems may, in fact, be integral within a computer or the like.

The controller 81 contains a receiving controller modem 85 (or pool of modems), a controller memory 86, and a controller chip 87. The memory 86 and an associated controller 87 oversee the operation of each modem 82: Each modem 82 therefore provides an interface to the twisted pairs 84. The controller 87 is a microprocessor or digital signal processor (DSP) and generally functions to control encoding and multiplexing of data, operation timing, baud rate and the administration of control information. In one embodiment, the algorithms of the present invention may be employed on the DSP or stored in the control memory 86. The control memory 86 also stores information and system algorithms required for the functional operation of the system as a whole.

The communication system 80 therefore contains bundles of twisted pairs 84 that communicate through modems 82 connected with different wire length loops and various different communications protocols. Using the methods of the present invention, the controller 81 is able to iteratively adjust the bandwidth, bitloading rates and power of the transmitted spectrum to ensure maximum data transfer rates while ensuring proper signal to noise ratios and reducing NEXT interference.

This embodiment implements the teachings of the invention via a centralized scheme, where the controller 81 instructs each modem in turn to perform the iterations of FIG. 5 (or FIG. 7) in an orderly fashion. In another embodiment, each modem operates autonomously without explicit instructions from a central controller. In that embodiment, each modem should continuously monitor its SNR margin and when the SNR margin differs significantly from its target value, it should trigger an adaptation of its PSD according to the rules of FIG. 5 (or FIG. 7). If several modems follow the same procedure and perform a number of similar spontaneous PSD adaptations, the system will eventually reach the desired equilibrium.

The present invention therefore solves the problems of NEXT interference found in prior art systems. By adjusting the parameters of frequency bandwidth, bitloading rates and power, maximum data transfer is achieved. In the foregoing specification, the invention has been described with reference to specific exemplary embodiments thereof. It will be evident that various modifications may be made thereto without departing from the broader spirit and scope of the invention.

The invention claimed is:

1. A method of iteratively adjusting frequency bandwidths in a communications network of twisted pair modem links containing a plurality of modems, the method comprising the acts of:
   for each of said plurality of modem links, transmitting signals with an initial power spectral density mask;
   measuring a signal to noise ratio for the transmitted signals;
   bitloading the initial power spectral density mask for a desired data rate and a desired signal to noise ratio margin;
   measuring and comparing an actual signal to noise ratio margin to the desired signal to noise ratio margin; and
   adjusting the frequency bandwidth allocated in the initial power spectral density mask to minimize NEXT interference if the actual signal to noise ratio margin is not within an acceptable tolerance of the desired signal to noise ratio margin.

2. The method of adjusting frequency bandwidth according to claim 1, wherein the act of adjusting the frequency bandwidth includes reducing the bandwidth when the actual signal to noise ratio margin is greater than the target signal to ration margin by a predetermined tolerance.

3. The method of adjusting frequency bandwidth according to claim 2, wherein the act of adjusting the frequency bandwidth includes increasing the bandwidth when the actual signal to noise ratio margin is less than the target signal to noise ratio margin by a predetermined tolerance.

4. The method of adjusting frequency bandwidth according to claim 3, wherein the act of adjusting the frequency bandwidth is repeated until the actual signal to noise ratio margin is within the acceptable tolerance of the target signal to ratio margin.

5. The method of adjusting frequency bandwidth according to claim 4, wherein an upstream and downstream frequency bandwidths are adjusted.

6. The method of adjusting frequency bandwidth according to claim 5, wherein bitloading and transmission rates are increased in frequency bandwidths of the power spectral density mask that do not produce NEXT interference.

7. The method of adjusting frequency bandwidth according to claim 5, wherein bitloading and transmission rates are decreased in frequency bandwidths of the power spectral density mask that produce NEXT interference.

8. The method of adjusting frequency bandwidth according to claim 5, wherein the upstream and downstream frequency bandwidths are adjusted by unequal amounts.

9. The method of adjusting frequency bandwidth according to claim 7, wherein the power of the upstream and downstream frequency bandwidths remains the same.

10. A communication system comprising:
a plurality of modems simultaneously communicating over a plurality of twisted pair connections; and
a controller for adjusting frequency bandwidths of upstream and downstream communications to reduce NEXT interference for each modem, wherein a process for adjusting the bandwidths of the upstream and downstream communications is repeated until a desired bit rate and desired signal to noise ratio margin are obtained,
wherein the process for adjusting the bandwidth includes transmitting signals with an initial cower spectral density mask, measuring a signal to noise ratio for the transmitted signals, bitloading the initial power spectral density mask for a desired data rate and a desired signal to noise ratio margin, measuring and comparing an actual signal to noise ratio margin to the desired signal to noise ratio margin, and adjusting the frequency bandwidth allocated in the initial power spectral density mask if the actual signal to noise ratio margin is not within an acceptable tolerance of the desired signal to noise ratio margin.

11. The communication system of claim 10, wherein the controller further comprises a control modem, a control memory and a controlling processor.

12. The communication system according to claim 10, wherein the process of adjusting bandwidth includes reducing the bandwidth of frequencies that produce NEXT interference.

13. The communication system of claim 12, wherein the process of adjusting the frequency bandwidth includes increasing the bandwidth when the actual signal to noise ratio margin is less than an acceptable tolerance below the desired signal to noise ratio margin.

14. A method of adjusting power and frequency bandwidth in a communications network of twisted pair modem links containing a plurality of modems, the method comprising the acts of:
for each of said plurality of modem links, transmitting signals with an initial power spectral density mask;
measuring a signal to noise ratio for the transmitted signals;
bitloading the initial power spectral density mask for a desired data rate and a desired signal to noise ratio margin;
measuring and comparing an actual signal to noise ratio margin to the desired signal to noise ratio margin; and
adjusting power and frequency bandwidth allocated in the initial power spectral density mask if the actual signal to noise ratio is not within an acceptable tolerance of the desired signal to noise ratio margin.

15. The method of adjusting power and frequency bandwidth of claim 14, wherein the act of adjusting the power and the frequency bandwidth includes reducing power within a selected frequency bandwidth when the actual signal to noise ratio margin is greater than the acceptable tolerance above the desired signal to noise ratio margin.

16. The method of adjusting power and frequency bandwidth of claim 15, wherein the act of adjusting power and the frequency bandwidth includes decreasing power within an upstream and down stream frequency bandwidth.

17. The method of adjusting power and frequency bandwidth of claim 14, wherein the act of adjusting power and the frequency bandwidth includes increasing power within a selected bandwidth when the actual signal to noise ratio margin is less than the acceptable tolerance below the desired signal to noise ratio margin.

18. The method of adjusting power and frequency bandwidth of claim 14, wherein the bandwidths of upstream and downstream communications overlap.

19. The method of adjusting power and frequency bandwidth of claim 14, wherein the power and bandwidth are adjusted in accordance with an algorithm.

20. A method of adjusting frequency bandwidths and bit transmission rates in a communications network of twisted pair modem links containing a plurality of modems to reduce NEXT interference, the method comprising the acts of:
determining frequency bandwidths allocated in an initial power spectral density mask that produce NEXT interference;
increasing bitloading and transmission rates in frequency bandwidths of the power spectral density mask that do not produce NEXT interference; and
decreasing bitloading and transmission rates in frequency bandwidths of the power spectral density mask that produce NEXT interference.

21. A method of adjusting frequency bandwidths and bit transmission rates as in claim 20, wherein the act of determining frequency bandwidths allocated in an initial power spectral density mask that produce NEXT interference includes measuring a signal to noise ratio.

22. A method of adjusting frequency bandwidths and bit transmission rates as in claim 20, wherein the act of determining frequency bandwidths allocated in an initial power spectral density mask that produce NEXT interference is performed repeatedly for each modem link communication channel.

23. A method of adjusting frequency bandwidths and bit transmission rates as in claim 22, wherein the act of determining frequency bandwidths allocated in an initial power spectral density mask that produce NEXT interference is performed while other modem links in the network are transmitting data.

24. A method of adjusting frequency bandwidths and bit transmission rates as in claim 20, wherein the act of decreasing bitloading and transmission rates in frequency bandwidths of the power spectral density mask that produce NEXT interference includes decreasing the power of signals that produce NEXT interference.

25. A method of adjusting transmission parameters in a communications network of twisted pair modem links containing a plurality of modems to reduce NEXT interference, the method comprising the acts of:
determining frequency bandwidths allocated in an initial power spectral density mask that produce NEXT interference; and
adjusting at least one of bitloading rates, power, and frequency bandwidth parameters of the power spectral density mask, wherein NEXT interference is minimized and a desired signal to noise ratio is maintained.

26. A method of adjusting transmission parameters as in claim 25, wherein at least two of bitloading rates, power, and frequency bandwidth parameters are adjusted.

27. A method of adjusting transmission parameters as in claim 25, wherein all of bitloading rates, power, and frequency bandwidth parameters are adjusted.

* * * * *